US008074691B2

(12) United States Patent
Chao et al.

(10) Patent No.: US 8,074,691 B2
(45) Date of Patent: Dec. 13, 2011

(54) THICKNESS MEASURING DEVICE OF LAMINATING MACHINE

(75) Inventors: Mei-Lien Chao, Taipei Hsien (TW); Yang-Chih Su, Taipei Hsien (TW)

(73) Assignee: Tex Year Industries Inc., Taipei Hsien (TW)

( * ) Notice: Subject to any disclaimer, the term of this patent is extended or adjusted under 35 U.S.C. 154(b) by 140 days.

(21) Appl. No.: 12/630,597

(22) Filed: Dec. 3, 2009

(65) Prior Publication Data
US 2011/0132545 A1 Jun. 9, 2011

(51) Int. Cl.
*B32B 41/00* (2006.01)
(52) U.S. Cl. ........ 156/360; 156/362; 156/363; 156/364; 156/378; 340/675
(58) Field of Classification Search .................. 156/360, 156/362, 363, 364, 378; 340/675
See application file for complete search history.

(56) References Cited

U.S. PATENT DOCUMENTS

| 6,717,521 B1* | 4/2004 | Leung ........................... 340/675 |
| 2008/0236757 A1* | 10/2008 | Huang et al. .................. 156/367 |

* cited by examiner

*Primary Examiner* — George Koch
(74) *Attorney, Agent, or Firm* — Muncy, Geissler, Olds & Lowe, PLLC

(57) ABSTRACT

A thickness measuring device of a laminating machine includes a mount, a stepper motor, a screw rod, a first contact-activated element, a second contact-activated element, and a microcontroller unit. The stepper motor is coupled to the mount. The screw rod is interlocked with the stepper motor. The first contact-activated element is provided at a position corresponding to and some distance below the screw rod. The second contact-activated element is provided at a position corresponding to and some distance above the screw rod. The microcontroller unit is electrically connected to the stepper motor, the first contact-activated element, and the second contact-activated element so as to provide initialization setting and exercise judgment and control after receiving a thickness measurement. Thus, the thickness of an object to be detected can be conveniently measured.

4 Claims, 5 Drawing Sheets

THICKNESS MEASURING DEVICE OF LAMINATING MACHINE

BACKGROUND OF THE INVENTION

1. Technical Field

The present invention relates to a thickness measuring device of a laminating machine and, more particularly, to a thickness measuring device which is composed of a mount, a stepper motor, a screw rod, a first contact-activated element, a second contact-activated element, and a microcontroller unit; configured for measuring the thickness of a to-be-detected object in a convenient manner; and applicable to various kinds of laminating machines or the like.

2. Description of Related Art

Generally, the thickness of paper is measured to the accuracy of a fraction of a millimeter. When a piece of paper is heated by a laminating machine during the lamination process, a 0.5-mm difference in paper thickness may result in a temperature difference up to 50° C. Hence, it has been an important goal in the field of laminating machines to develop an electronic design that enables precise thickness measurement, features convenient operation, and thus enhances the performance of laminating machines. Moreover, with the man-machine interface of a conventional laminating machine, a user has to select the desired laminating film thickness and the type of to-be-laminated object by pressing keys, which is rather inconvenient. Therefore, the prior art still leaves much to be desired in practical use.

BRIEF SUMMARY OF THE INVENTION

The primary objective of the present invention is to provide a thickness measuring device of a laminating device, wherein the thickness measuring device is composed of a mount, a stepper motor, a screw rod, a first contact-activated element, a second contact-activated element, and a microcontroller unit, and wherein measurement is conducted via pulse signals that control the stepper motor. More specifically, the high level (logical 1), low level (logical 0), positive edges, or negative edges of the pulse signals are detected by an electronic signal detection method so as to trigger a counting process. As the count that corresponds to one complete turn of a thread of the screw rod is pre-defined, and the precision of axial distance of the screw rod is known, the counts obtained can be converted into a thickness measurement (thickness=C0–C1). Thus, the thickness of an object to be detected can be measured conveniently, thereby increasing the usefulness and ease of operation of the laminating machine as a whole. Another objective of the present invention is to provide the foregoing thickness detecting device of a laminating machine, wherein the thickness measurement is sent to the microcontroller unit for being judged by a firmware, such that the thickness measurement is either sent to a heater so as to raise or lower the heating temperature, or used to change the rotating speed of a motor. Then, a guide roller set is activated to rotate forward, thereby guiding a piece of paper through a lamination process. Hence, the temperature setting of the laminating machine and the rotating speed of the motor can be selected according to the thickness measurement, thereby increasing the overall usefulness and convenience of the laminating machine.

To achieve the above objectives, the present invention provides a thickness measuring device of a laminating machine, wherein the thickness measuring device includes a mount, a stepper motor, a screw rod, a first contact-activated element, a second contact-activated element, and a microcontroller unit. The stepper motor is coupled to the mount. The screw rod is interlocked with the stepper motor. The first contact-activated element is provided at a position corresponding to and some distance below the screw rod. The second contact-activated element is provided at a position corresponding to and some distance above the screw rod. The microcontroller unit is electrically connected to the stepper motor, the first contact-activated element, and the second contact-activated element so as to provide initialization setting and exercise judgment and control after receiving a thickness measurement. Thus, the thickness of an object to be detected can be measured with ease, and the laminating machine as a whole is therefore enhanced in usefulness and convenience of use.

The aforesaid and other objectives as well as advantages of the present invention can be best understood by referring to the following detailed description of an illustrative embodiment in conjunction with the accompanying drawings. However, while the illustrative embodiment is detailed herein and shown in the drawings, it is understood that certain components, or arrangement thereof, of the present invention may vary in other embodiments.

DETAILED DESCRIPTION OF THE INVENTION

Figure 1:
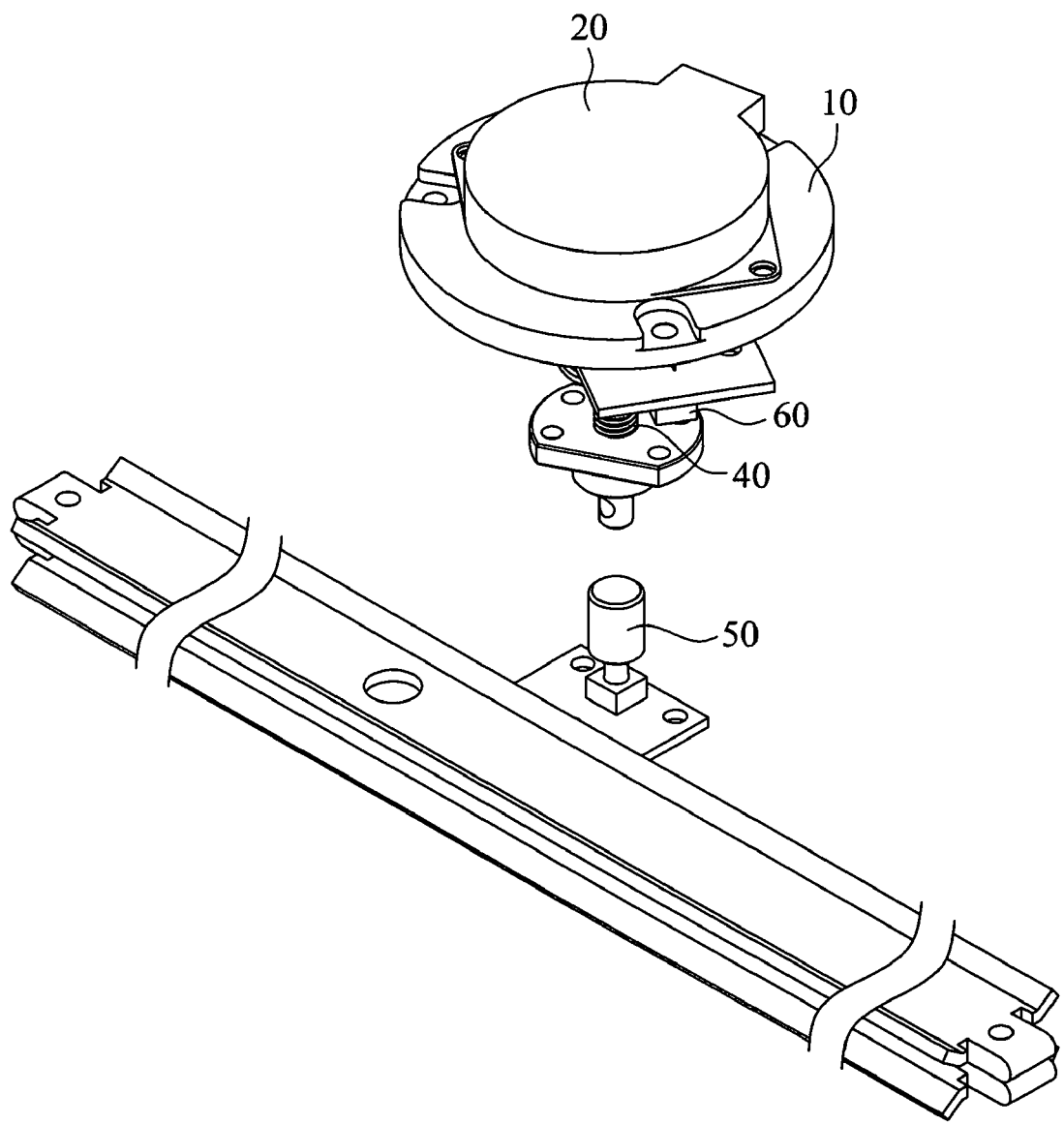
FIG. 1 is a perspective view of the present invention.
Figure 2:
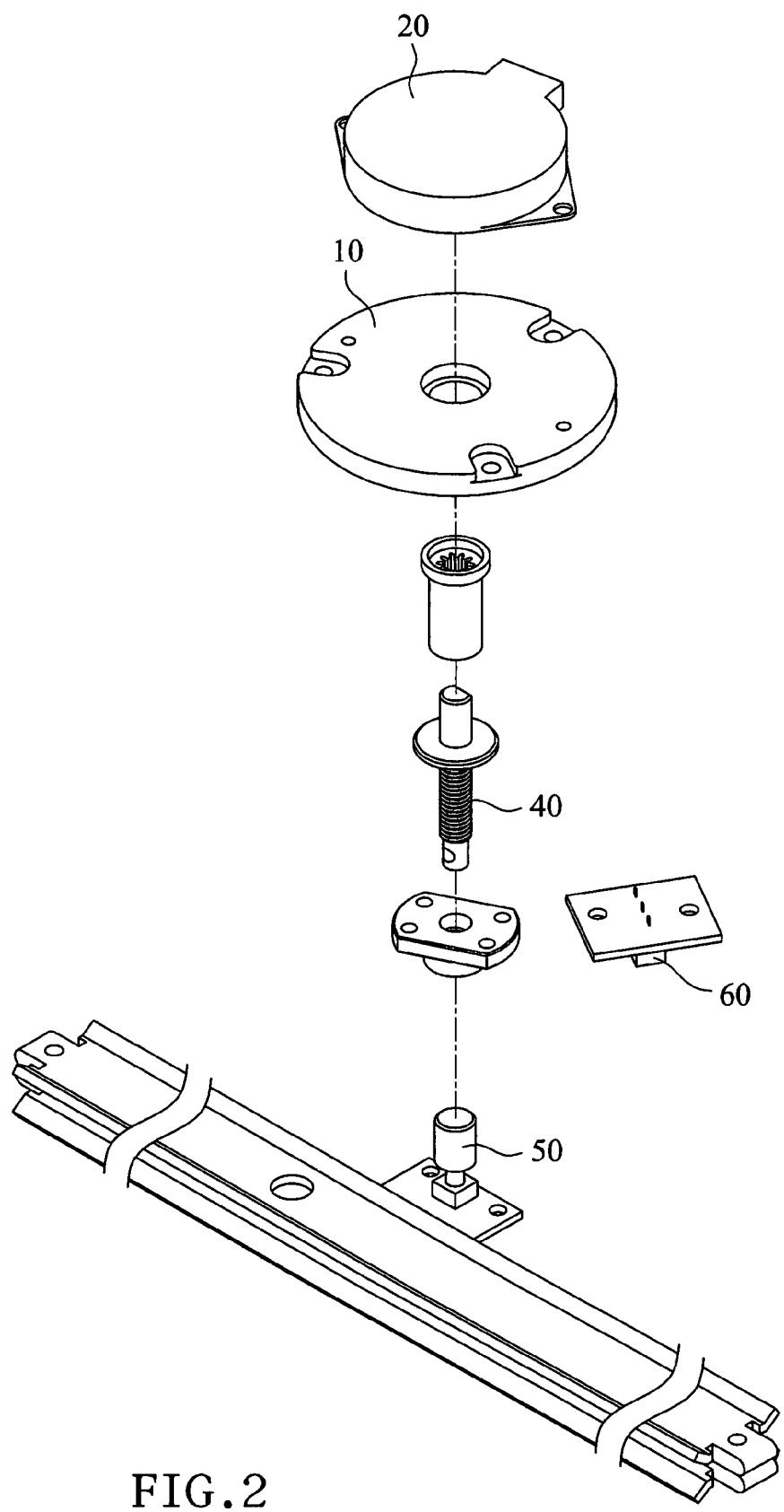
FIG. 2 is an exploded perspective view of the present invention.
Figure 3:
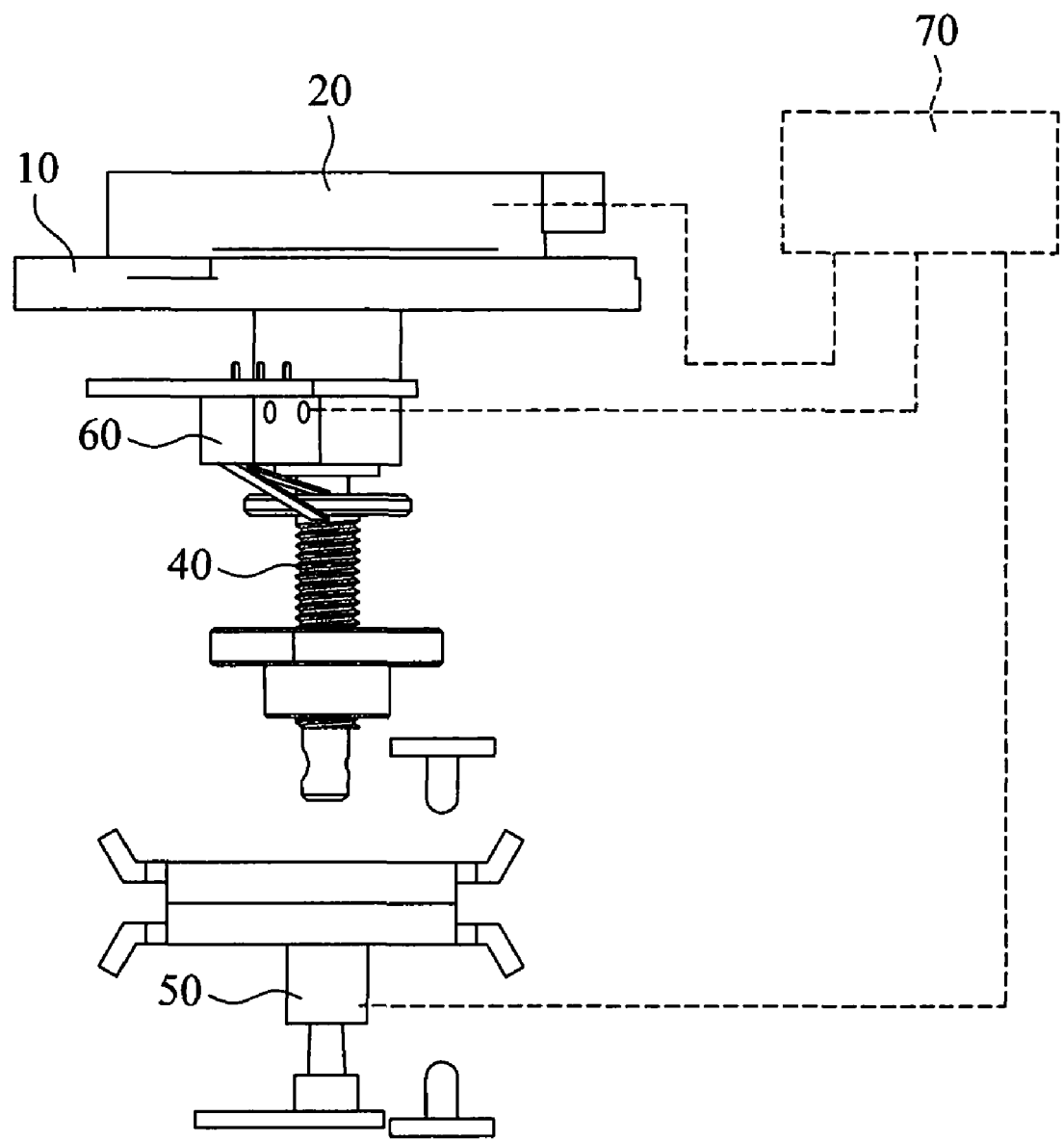
FIG. 3 is an assembled sectional view of the present invention.
Figure 4:
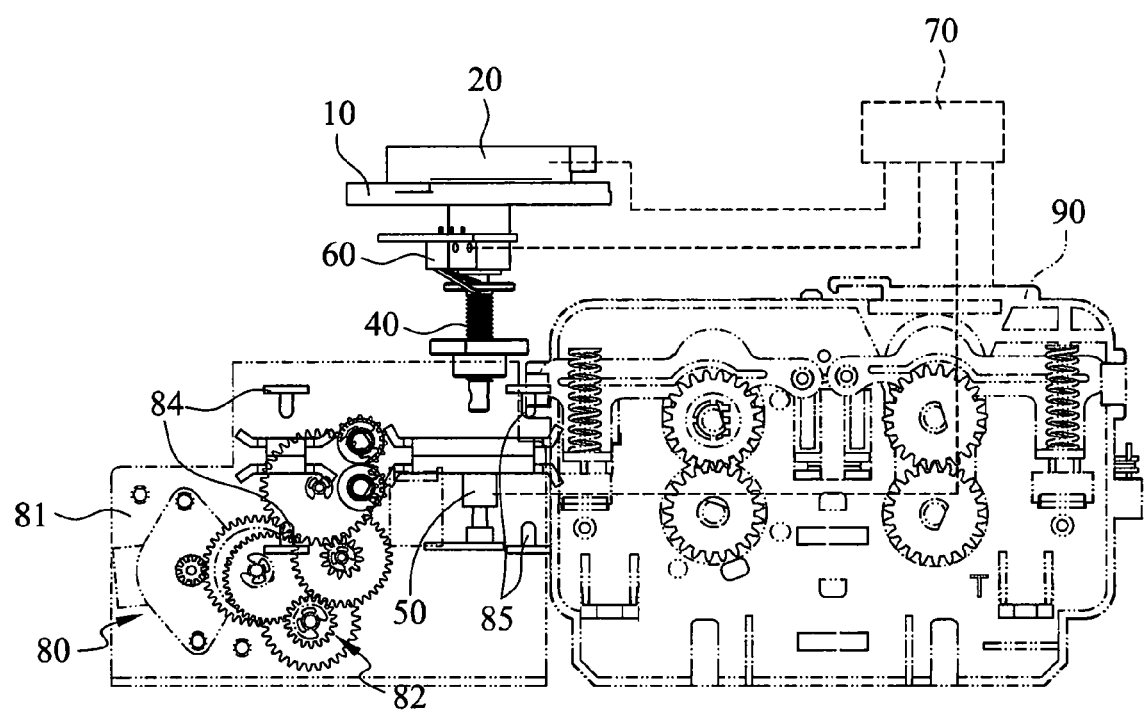
FIG. 4 is a schematic drawing showing the present invention in use.
Figure 5:
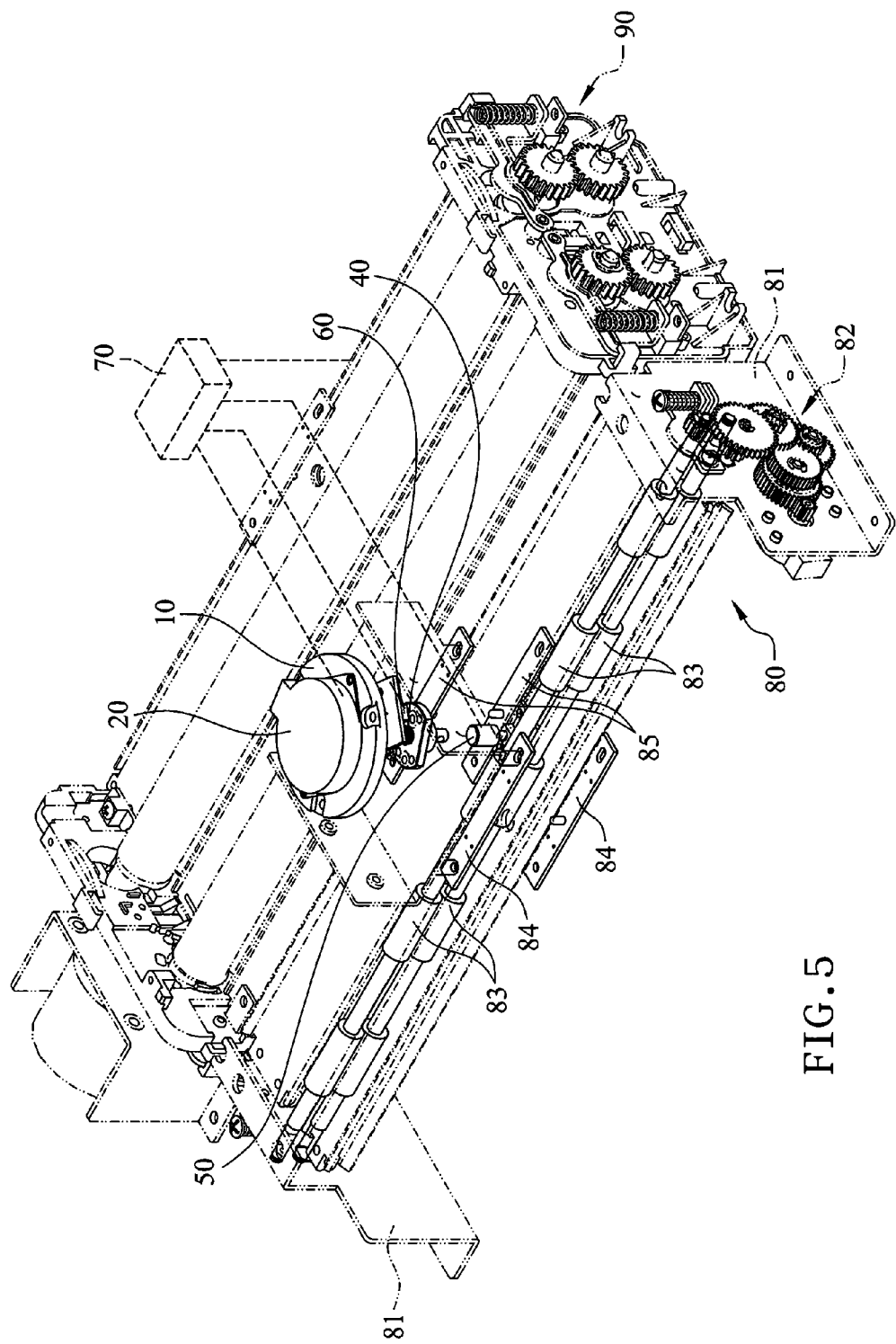
FIG. 5 is a perspective view of the present invention in use.

According to an embodiment of the present invention as shown in FIGS. 1 through 5, a thickness measuring device of a laminating machine includes a mount 10, a stepper motor 20, a screw rod 40, a first contact-activated element 50, a second contact-activated element 60, and a microcontroller unit (MCU) 70.

The stepper motor 20 is coupled to the mount 10. The stepper motor 20 is controlled and driven by pulse signals.

The screw rod 40 is interlocked with the stepper motor 20 so as to be moved vertically up and down.

The first contact-activated element 50 is provided at a position corresponding to and some distance below the screw rod 40. The first contact-activated element 50 is a contact switch.

The second contact-activated element 60 is provided at a position corresponding to and some distance above the screw rod 40. The second contact-activated element 60 is a contact switch.

The microcontroller unit 70 is electrically connected to the stepper motor 20, the first contact-activated element 50, and the second contact-activated element 60 so as to provide initialization setting and exercise judgment and control after receiving a thickness measurement.

The mount 10 is further coupled to a transmission mechanism 80 and a laminating mechanism 90 such that the microcontroller unit 70 is electrically connected to the transmission mechanism 80 and the laminating mechanism 90. The transmission mechanism 80 is provided with a machine body 81, a driver set 82, a guide roller set 83, a first sensor set 84, and a second sensor set 85. The driver set 82 is provided at two sides of the machine body 81 and configured to drive the guide roller set 83. The first sensor set 84 and the second sensor set 85 are disposed at a front end and a rear end of the machine body 81, respectively.

According to the present invention, a thickness measuring method for use in a laminating machine includes the following steps:

Step 1: When power is turned on, the microcontroller unit 70 begins initialization, and the stepper motor 20 is activated. As a result, the screw rod 40 rotates downward to the first contact-activated element 50 below and thereby triggers a signal. After that, the screw rod 40 rotates upward to the second contact-activated element 60 above, thereby triggering another signal, and then stops rotating. Thus, a first counting process is completed, and a count C0 is obtained.

Step 2: When the first sensor set 84 senses an object to be detected, the guide roller set 83 is activated to rotate forward and guide the object to be detected. As soon as the second sensor set 85 senses the object to the detected, the guide roller set 83 is stopped from rotating, and the screw rod 40 is ready for a second counting process.

Step 3: The stepper motor 20 is activated such that the screw rod 40 rotates downward to the first contact-activated element 50 below and triggers a signal. Then, the screw rod 40 rotates upward to the second contact-activated element 60 above, triggers another signal, and stops rotating. Thus, the second counting process is completed, and a count C1 is obtained.

Step 4: The difference of the counts obtained is calculated as a thickness measurement (thickness=C0−C1).

Step 5: The thickness measurement (thickness=C0−C1) is sent to the microcontroller unit 70 so as to be judged by a firmware. As a result, the thickness measurement is sent to a heater, which raises or lowers the heating temperature accordingly. Alternatively, the thickness measurement is used to change the rotating speed of a motor. Afterward, the guide roller set 83 is activated to rotate forward and thereby guide a piece of paper through a lamination process.

The thickness measuring device configured for use in a laminating machine and described as above has the following features. As shown in FIGS. 1 through 5, the thickness measuring device is composed of the mount 10, the stepper motor 20, the screw rod 40, the first contact-activated element 50, the second contact-activated element 60, and the microcontroller unit 70. Measurement is conducted via the pulse signals that control the stepper motor 20. More specifically, the high level (logical 1), low level (logical 0), positive edges, or negative edges of the pulse signals are detected by an electronic signal detection method so as to trigger the counting process. As the count that corresponds to one full turn of a thread of the screw rod 40 is pre-defined, and the precision of axial distance of the screw rod 40 is known, the counts obtained can be calculated so as to produce a thickness measurement (thickness=C0−C1). The thickness measurement is sent to the microcontroller unit 70 for being judged by a firmware. As a result, the thickness measurement is sent to a heater so as to raise or lower the heating temperature, or is used to change the rotating speed of a motor. Then, the guide roller set 83 is activated to rotate forward, thereby guiding a piece of paper through a lamination process. Hence, the thickness of an object to be detected can be easily measured, and the temperature setting of the laminating machine and the rotating speed of the motor can be selected according to the thickness measurement, thereby increasing the overall usefulness and convenience of the laminating machine.

Presented below is an example of the foregoing thickness measuring method.

First of all, the screw lead of the screw rod 40 is defined (such as 1 mm), and the number of pulses that corresponds to a complete turn of a thread of the screw rod 40 is defined (such as 100 pulses each turn).

The pulse count that corresponds to a complete turn of a thread of the screw rod 40 can be determined by any electronic signal detection method. Now that a complete turn corresponds to 100 pulses, and the screw lead of the screw rod 40 is 1 mm, the axial distance of the screw rod 40 can be detected to the precision of 0.01 mm.

If the count C0 is 278, and the count C1 is 253, then the difference of counts is 278−253=25. The 25 pulses correspond to 0.25 mm of axial distance of the screw rod 40.

As would be understood by a person skilled in the art after reviewing the above detailed description, the present invention is indeed capable of achieving the aforesaid objectives and meets the requirements for patent application as stipulated by the Patent Act. Therefore, an application for patent of the present invention is hereby filed for examination.

The embodiment described above is only a preferred embodiment and is not intended to limit the scope of the present invention, which is defined only by the appended claims. All equivalent changes and modifications based on the claims and the contents of the present specification should fall within the scope of the present invention.

What is claimed is:

1. A thickness measuring device of a laminating device, the thickness measuring device comprising:
    a mount;
    a stepper motor coupled to the mount;
    a screw rod interlocked with and driven by the stepper motor,
    a first contact-activated electrical element provided at a position corresponding to and some distance below the screw rod and in contact with a sheet whose thickness is to be measured;
    a second contact-activated electrical element provided at a position corresponding to and some distance above the screw rod;
    the screw rod being driven to contact the first and second contact-activated electrical elements to measure a distance therebetween
    a microcontroller unit electrically connected to the stepper motor, the first contact-activated element, and the second contact-activated element so as to provide initialization setting and exercise judgment and control upon receiving a thickness measurement.

2. The thickness measuring device of claim 1, wherein the first contact-activated electrical element and the second contact-activated electrical element are contact switches.

3. The thickness measuring device of claim 1, wherein the mount is further coupled with a transmission mechanism and a laminating mechanism such that the microcontroller unit is electrically connected to the transmission mechanism and the laminating mechanism.

4. The thickness measuring device of claim 3, wherein the transmission mechanism is provided with a machine body, a driver set, a guide roller set, a first sensor set, and a second sensor set, the driver set being provided bilaterally on the machine body and configured for driving the guide roller set while the first sensor set and the second sensor set are disposed at a front end and a rear end of the machine body, respectively.

\* \* \* \* \*